US010183687B2

(12) United States Patent
Kubo et al.

(10) Patent No.: US 10,183,687 B2
(45) Date of Patent: Jan. 22, 2019

(54) PUSHCART

(71) Applicant: Murata Manufacturing Co., Ltd., Kyoto (JP)

(72) Inventors: Masayuki Kubo, Kyoto (JP); Kenichi Shirato, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 256 days.

(21) Appl. No.: 15/094,172

(22) Filed: Apr. 8, 2016

(65) Prior Publication Data

US 2016/0221594 A1 Aug. 4, 2016

Related U.S. Application Data

(63) Continuation of application No. PCT/JP2014/075353, filed on Sep. 25, 2014.

(30) Foreign Application Priority Data

Oct. 11, 2013 (JP) ................................. 2013-213386

(51) Int. Cl.
*B62B 5/00* (2006.01)
*B62B 5/06* (2006.01)
(Continued)

(52) U.S. Cl.
CPC .............. *B62B 5/0069* (2013.01); *A61H 3/04* (2013.01); *B62B 3/00* (2013.01); *B62B 3/001* (2013.01);
(Continued)

(58) Field of Classification Search
None
See application file for complete search history.

(56) References Cited

U.S. PATENT DOCUMENTS

2004/0055804 A1 3/2004 Kamen et al.
2005/0081932 A1 4/2005 Sari
(Continued)

FOREIGN PATENT DOCUMENTS

JP S62-80709 A 4/1987
JP H09-249129 A 9/1997
(Continued)

OTHER PUBLICATIONS

Itnernational Search Report issued in Application No. PCT/JP2014/075353 dated Nov. 11, 2014.
(Continued)

*Primary Examiner* — Thomas G Black
*Assistant Examiner* — Demetra R Smith-Stewart
(74) *Attorney, Agent, or Firm* — Pearne & Gordon LLP

(57) ABSTRACT

A pushcart includes a steering unit, a main wheel, a dolly portion, an auxiliary wheel, a connecting unit, a slope angle sensor, a gyrosensor, and a case. On one end of the steering unit, there is provided a cylinder-shaped hinge unit that is supported in a rotatable manner at the other end of the connecting unit on the opposite side to the main wheels, and a holding portion is provided on the other end of the steering unit. A controller performs inverted pendulum control in which the main wheels are rotated based on the detection results of the gyrosensor and the slope angle sensor.

20 Claims, 10 Drawing Sheets

(51) Int. Cl.
*B62B 3/00* (2006.01)
*A61H 3/04* (2006.01)
(52) U.S. Cl.
CPC ........ *B62B 5/068* (2013.01); *A61H 2003/043* (2013.01); *A61H 2201/0173* (2013.01); *A61H 2201/5007* (2013.01); *A61H 2201/5069* (2013.01)

(56) References Cited

U.S. PATENT DOCUMENTS

| | | | | |
|---|---|---|---|---|
| 2008/0309039 | A1* | 12/2008 | Bailey | B62B 7/04 280/47.34 |
| 2009/0038864 | A1* | 2/2009 | Yun | B62B 1/045 180/19.1 |
| 2013/0306120 | A1 | 11/2013 | Fukunaga | |
| 2014/0129086 | A1* | 5/2014 | Takenaka | B62D 6/003 701/41 |
| 2014/0265224 | A1* | 9/2014 | Takenaka | B62K 21/10 280/274 |
| 2016/0193103 | A1* | 7/2016 | Hane | A61H 3/04 701/48 |

FOREIGN PATENT DOCUMENTS

| | | |
|---|---|---|
| JP | 2003-502002 A | 1/2003 |
| JP | 2004-142734 A | 5/2004 |
| JP | 2011-207277 A | 10/2011 |
| JP | 2012-250569 A | 12/2012 |
| JP | 2013-056601 A | 3/2013 |
| WO | 2012/114597 A1 | 8/2012 |

OTHER PUBLICATIONS

Written Opinion issued in Application No. PCT/JP2014/075353 dated Nov. 11, 2014.
Minami Mamoru et al., "Experiment of Control System, 1. Control of Inverted Pendulums" dated Nov. 2009; http://web.archive.org/web/20091108202432/http://www.suri.sys.okayama-u.ac.jp/research/experi/experiment.html; retrieved on May 13, 2016.

* cited by examiner

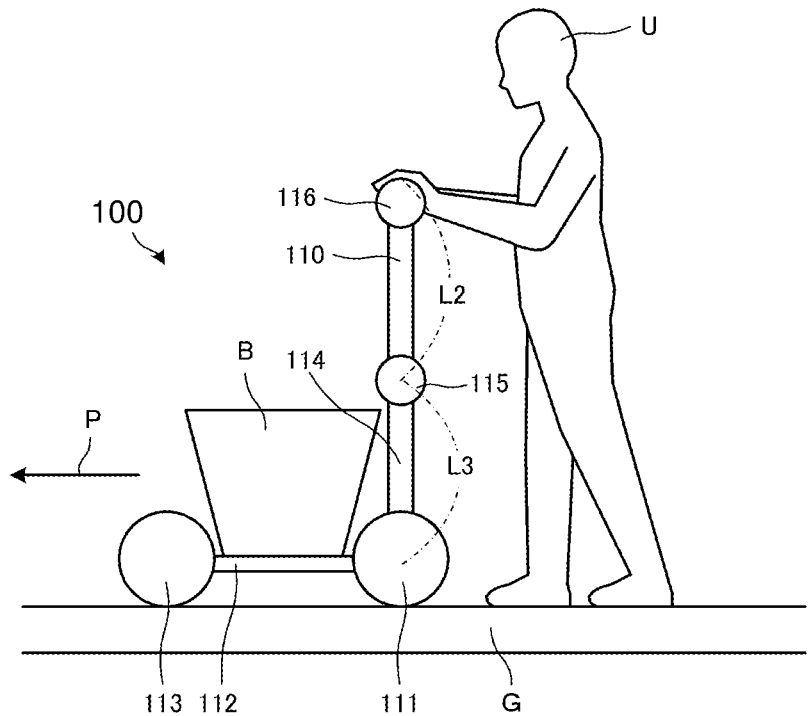
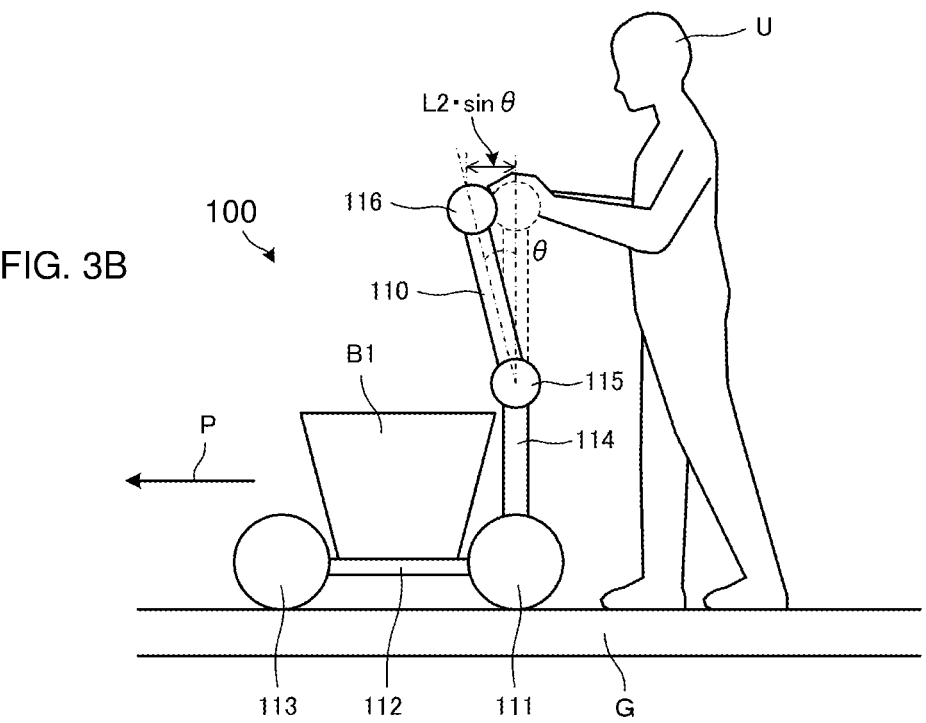

PUSHCART

BACKGROUND

Technical Field

The present disclosure relates to pushcarts that include wheels and drive and control the stated wheels.

There are pushcarts that drive and control wheels thereof while performing inverted pendulum control. For example, Non Patent Document 1 discloses a dolly that drives and controls wheels thereof while performing inverted pendulum control.

FIG. 10 is a schematic side view of a dolly 900 disclosed in Non Patent Document 1. The dolly 900 includes a dolly portion 912, a front wheel 913, and a rear wheel 911 supported by the dolly portion 912 in a rotatable manner, and an inverted pendulum 910 supported at the center of the dolly portion 912 in a rotatable manner.

The dolly 900 maintains a state in which the inverted pendulum 910 stands upright facing the vertical direction by performing inverted pendulum control for controlling the rotation of the front wheel 913 and the rear wheel 911.

FIGS. 11A and 11B show schematic side views of a pushcart 800 assuming a case where the basic idea of the dolly 900 is applied to the pushcart. The pushcart 800 includes a plate-like dolly portion 812, a pair of auxiliary wheels 813 supported by the dolly portion 812 in a rotatable manner, a pair of main wheels 811 supported by the dolly portion 812 in a rotatable manner, and a steering unit 810 supported by the dolly portion 812 in a rotatable manner. The steering unit 810 corresponds to the above-mentioned inverted pendulum 910.

One end of the steering unit 810 is supported by an end of the dolly portion 812 on the main wheel 811 side in a rotatable manner, and a holding portion 816 is provided on the other end of the steering unit 810. A user U places a load B on the dolly portion 812, holds the holding portion 816, and then moves the pushcart 800 in a travelling direction P.

The pushcart 800 maintains a state in which the steering unit 810 stands upright facing the vertical direction by performing inverted pendulum control for controlling the rotation of the main wheels 811. Because of this, even if the user U holds the holding portion 816 and pushes the holding portion 816 in the travelling direction, the main wheels 811 rotate and the dolly portion 812 also moves in the travelling direction P, whereby the posture of the steering unit 810 is maintained to be constant.

Non Patent Document 1: "Experiment of Control System", "1. Inverted Pendulum Control Experiment", [online]; Feb. 5, 2000; Minami Mamoru and two other members; [Searched on Jul. 10, 2013], Internet <URL: http://www.suri.sys.okayama-u.ac.jp/research/experi/experiment.html>

BRIEF SUMMARY

While taking one end of the steering unit 810 supported at the end of the dolly portion 812 on the main wheel 811 side as a rotational shaft, the pushcart 800 is constituted such that the holding portion 816 on the other end of the steering unit 810 rotates. In other words, in the case where a length from the above-mentioned rotational shaft to the other end of the steering unit 810 is taken as L1, and an angle by which the user U holds the holding portion 816 and pushes the steering unit 810, standing upright in the vertical direction, in a pitch direction (a rotational direction about a rotational shaft of the main wheels 811 shown in FIGS. 11A and 11B) is taken as $\theta$, a movement distance of the holding portion 816 is represented as $L1 \cdot \sin \theta$ (when $\theta$ is near 0 degree, it takes an approximate value of $\theta \cdot L1$). The length L1 needs to be set to a value of length in accordance with the height of the user U to use the pushcart 800.

As such, in the pushcart 800 assuming the application of the conventional technique, the movement distance $L1 \cdot \sin \theta$ of the holding portion 816 is long. Because of this, when the user U holds the holding portion 816 and moves the pushcart 800, the user U needs to largely push the holding portion 816 in the pitch direction. This raises a problem that user-operability of the pushcart 800 assuming the application of the conventional technique is not good.

The present disclosure provides a pushcart with improved user-operability by making the movement distance of the holding portion shorter than the conventional one.

A pushcart according to the present disclosure includes a base unit, a plurality of main wheels supported by the base unit in a rotatable manner, an auxiliary wheel supported by the base unit in a rotatable manner about a rotational shaft which differs from a rotational shaft of the plurality of main wheels, a driver unit for driving the plurality of main wheels, and a controller for controlling the driver unit.

The pushcart according to the present disclosure further includes a connecting unit that is connected to the base unit and extends in a direction being distanced from a ground surface with which the plurality of main wheels make contact, a steering unit supported in a rotatable manner in a pitch direction at an end portion of the connecting unit on the opposite side to the plurality of main wheels, and an angle change detector for detecting an angle change in a slope angle of the steering unit in the pitch direction. A holding portion is provided on an upper end portion of the steering unit.

The controller controls the driver unit based on output of the angle change detector so that the angle change of the steering unit in the pitch direction becomes 0.

In other words, the pushcart of the present disclosure performs inverted pendulum control in which the angle of the steering unit in the pitch direction is maintained. Accordingly, the pushcart of the present disclosure moves in a direction in which the user moves the holding portion. That is, the pushcart of the present disclosure moves following the movement of the holding portion operated by the user. With this, the pushcart of the present disclosure can give a feeling of safety to the user because of having the above movement catch-up capability in comparison with a pushcart that does not perform inverted pendulum control (for example, a pushcart in which such a technique that moves a vehicle with lever operation as disclosed in an electric wheelchair of Japanese Unexamined Patent Application Publication No. 2010-284469 is applied).

While taking one end of the steering unit as a rotational shaft, the pushcart of the present disclosure is constituted such that the holding portion on the other end of the steering unit rotates. In other words, in the case where a length from the above rotational shaft to the other end of the steering unit is taken as L2, and an angle by which a user holds the holding portion and pushes the steering unit, standing upright in the vertical direction, in the pitch direction is taken as $\theta$, a movement distance of the holding portion is represented as $L2 \cdot \sin \theta$.

The length L2 needs to be set to a value of length in accordance with the height of a user to use the pushcart of the present disclosure. Note that the length L2 is shorter than the length L1 of the pushcart 800 assuming the application of the conventional technique as shown in FIGS. 11A and 11B, by an amount of height of the connecting unit extending in the direction being distanced from the ground surface with which the plurality of main wheels make contact (or an amount of length of the connecting unit in the case where the connecting unit extends in the vertical direction).

Accordingly, the movement distance $L2 \cdot \sin\theta$ of the holding portion of the pushcart of the present disclosure is shorter than the movement distance $L1 \cdot \sin\theta$ of the holding portion 816 of the pushcart 800 assuming the application of the conventional technique. As such, when a user holds the holding portion and moves the pushcart of the present disclosure, it is sufficient for the user to push the holding portion in the pitch direction by a short distance in comparison with the pushcart 800 assuming the application of the conventional technique.

Therefore, according to the pushcart of the present disclosure, it is possible to make the movement distance of the holding portion shorter than that of the pushcart 800 assuming the application of the conventional technique, and improve the user-operability.

It is to be noted that the holding portion is not limited to being supported by the steering unit precisely at the end of the steering unit, and it is sufficient for the holding portion to be supported by the steering unit at the end side thereof.

The pushcart according to the present disclosure can further include a blocking unit that prevents the steering unit from rotating up to no less than a predetermined angle.

For example, in the case where the auxiliary wheel makes contact with a step during the pushcart of the present disclosure travelling, the auxiliary wheel may not ride over the step with toque of the pushcart of the present disclosure in some case even if the user rotates the holding portion. In this case, with the configuration of the present disclosure, the auxiliary wheel and the main wheels can ride over the step by the user pushing, with his or her force, the holding portion whose rotation being blocked at a predetermined angle.

At this time, because the steering unit does not rotate up to no less than a predetermined angle relative to the vertical direction, in other words, the torque of the pushcart of the present disclosure is restricted by the blocking unit, a sudden start of the push cart of the present disclosure can be prevented immediately after the auxiliary wheel and the main wheels have ridden over the step.

Further, even in the case where the power for the pushcart of the present disclosure is turned off, the user can manually move the pushcart of the present disclosure by pushing, with his or her force, the holding portion whose rotation is blocked at a predetermined angle.

The pushcart according to the present disclosure can further include a rotation detector for detecting whether or not the plurality of main wheels are being rotated. Furthermore, the controller can stop driving of the plurality of main wheels by the driver unit in the case where the controller determines, based on output of the rotation detector, that the rotation of the plurality of main wheels is substantially stopped with the angle change of the steering unit in the pitch direction being not 0.

With this, in the case where the pushcart of the present disclosure does not proceed, even if the user pushes the pushcart, because the auxiliary wheel is caught by a step, wall, or the like, for example, a motor of the driver unit can be prevented from being damaged by stopping the driving of the main wheels. Note that "being substantially stopped" is a state in which the number of rotations of the main wheel in the pitch direction is lower than a predetermined threshold.

The pushcart according to the present disclosure can further include a slope angle detector for detecting an angle change in a slope angle of the base unit. Furthermore, the controller can calculate, based on output of the slope angle detector, torque for compensating gravitational toque due to a slope of the ground surface and control the driver unit.

In this configuration, even in the case where the pushcart of the present disclosure is present on a sloping road, because the torque for compensating the gravitational torque due to a slant of the sloping road acts on the main wheels, the pushcart of the present disclosure can be prevented from unintendedly descending the sloping road.

Further, an end portion of the connecting unit on the steering unit side can be positioned in a space that is located in an outer side portion relative to the main wheels and the auxiliary wheel in a movement direction of the pushcart moved by the rotation of the plurality of main wheels, and that is also located in the opposite direction of the above movement direction.

With this configuration, the connecting unit and the steering unit are slanted so that the steering unit approaches the user side relative to the main wheels and the auxiliary wheel. This makes it possible for the user to obtain a wide stepping space. Because of this, it can prevent the foot of the user from contacting the rear wheels of the pushcart when the user is pushing and moving the pushcart, for example.

The pushcart can further include an adjustment mechanism for adjusting one of lengths of the connecting unit and the steering unit.

With this configuration, the lengths of the connecting unit and the steering unit are adjusted in accordance with the height, arm length, or the like of a user. Further, the adjustment mechanism can fix the length L2 of the steering unit and only adjust a length L3 of the connecting unit. Through this, even if the total length (L2+L3) of the connecting unit and the steering unit is adjusted only by the length L3 of the connecting unit in accordance with the height or the like of the user, operability of the holding portion for the user is maintained because the movement distance (corresponding to the length L2) of the holding portion supported at the end portion of the steering unit does not change.

Further, the angle change detector may include a rotary encoder disposed in a connecting portion of the connecting unit and the steering unit, or include at least one of a gyrosensor, a slope angle sensor, and an acceleration sensor.

According to the present disclosure, the movement distance of the holding portion can be made shorter than the conventional one and the user-operability can be improved.

BRIEF DESCRIPTION OF THE SEVERAL VIEWS OF THE DRAWINGS

FIGS. 3A and 3B include schematic side views of the pushcart 100 shown in FIG. 1 when a user U moves the pushcart 100.

DETAILED DESCRIPTION

Hereinafter, a pushcart 100 according to a first embodiment of the present disclosure will be described.

Figure 1:
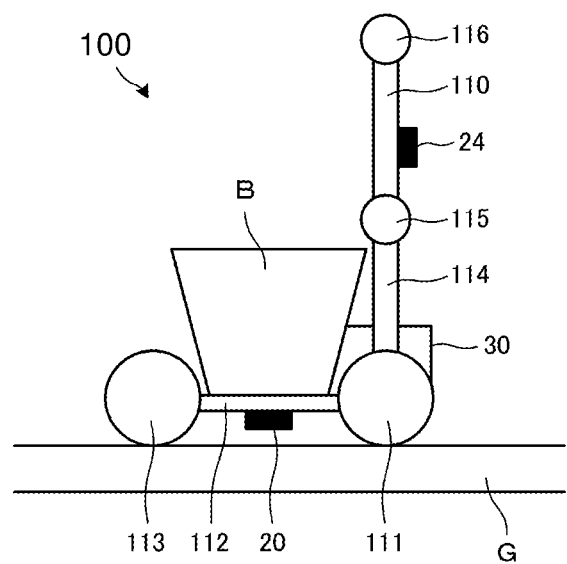
FIG. 1 is a schematic side view of a pushcart 100 according to a first embodiment of the present disclosure.
Figure 2:
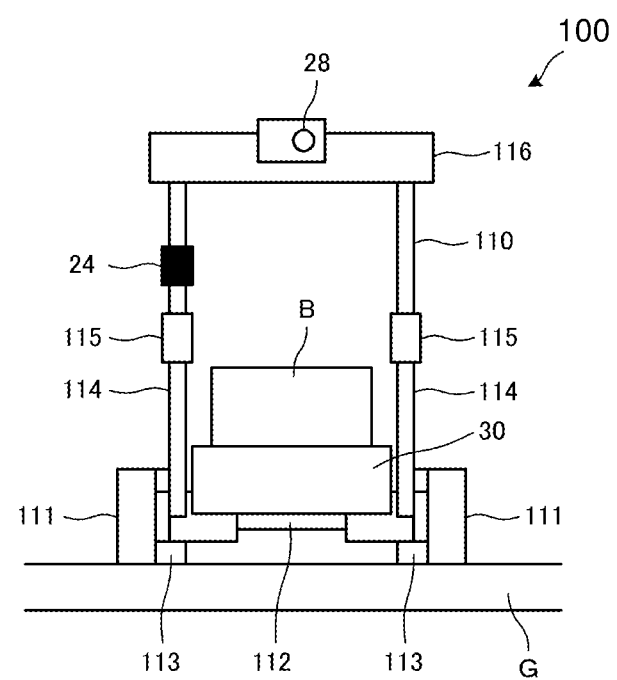
FIG. 2 is a schematic rear view of the pushcart 100 shown in FIG. 1.

FIG. 1 is a schematic side view of the pushcart 100 according to the first embodiment of the present disclosure. FIG. 2 is a schematic rear view of the pushcart 100 shown in FIG. 1. FIGS. 3A and 3B include schematic side views of the pushcart 100 shown in FIG. 1 when a user U moves the pushcart 100.

The pushcart 100 includes, as shown in FIGS. 1 and 2, a steering unit 110, a main wheel 111, a dolly portion 112, an auxiliary wheel 113, a connecting unit 114, a slope angle sensor 20, a gyrosensor 24, and a case 30. The pushcart 100 is used as a shopping cart, a baby carriage, or a walking assistant cart, for example.

The dolly portion 112 corresponds to "base unit" of the present disclosure. The gyrosensor 24 corresponds to "angle change detector" of the present disclosure. The slope angle sensor 20 corresponds to "slope angle detector" of the present disclosure.

Note that, in order to facilitate understanding of a rotational state of the steering unit 110, the slope angle sensor 20 and the gyrosensor 24 are omitted in FIGS. 3A and 3B for convenience.

The dolly portion 112 is formed in a plate-like shape, and the slope angle sensor 20 is attached to a bottom surface of the dolly portion 112. Note that a pair of main wheels 111 opposing each other is supported by the dolly portion 112 in a rotatable manner. A pair of auxiliary wheels 113 opposing each other is supported by the dolly portion 112 in a rotatable manner.

Each of the pair of main wheels 111 is independently attached to a drive shaft, and is driven separately and rotated. However, the pair of main wheels 111 can be rotated in synchronization with each other. In the present embodiment, although an example in which the main wheels 111 take the form of two wheels is cited, the disclosure is not limited to the form of two wheels. Likewise, although an example in which the auxiliary wheels 113 take the form of two wheels is cited in the present embodiment, the disclosure is not limited to the form of two wheels.

To an end of the dolly portion 112 on the main wheel 111 side, one end of the connecting unit 114 configured of two bar-like members extending in the vertical direction is connected.

Although the connecting unit 114 extends in the vertical direction in the pushcart 100, the disclosure is not limited thereto. It is sufficient that the connecting unit 114 extends in a direction being distanced from a ground surface G with which the pair of main wheels 111 makes contact (for example, see FIG. 6 to be explained later).

The gyrosensor 24 is attached to the steering unit 110. On one end of the steering unit 110, there is provided a cylinder-shaped hinge unit 115 that is supported in a rotatable manner by one end of the connecting unit 114 on the opposite side to the main wheels 111, and a holding portion 116 is provided on the other end of the steering unit 110. Note that the hinge unit 115 is not limited to the cylinder shape.

In the hinge unit 115, there is provided a blocking mechanism that prevents the steering unit 110 from rotating up to no less than a predetermined angle relative to the vertical direction (for example, 30 degrees in a forward direction and backward direction, respectively).

In the holding portion 116, a user interface (a user I/F 28 shown in FIG. 4) including a power switch of the pushcart 100 and the like is provided. As shown in FIGS. 3A and 3B, a user U holds the holding portion 116 from a side opposite to the auxiliary wheels 113 after having placed a load B on the dolly portion 112 or places the forearms or the like on the holding portion 116, and then moves the pushcart 100 in the forward or backward direction on the ground surface G.

The case 30 (not shown in FIGS. 3A and 3B) is mounted on the dolly portion 112 and stores a control circuit board, a battery, and the like.

Next, the configuration and basic operations of the pushcart 100 will be described.

Figure 4:
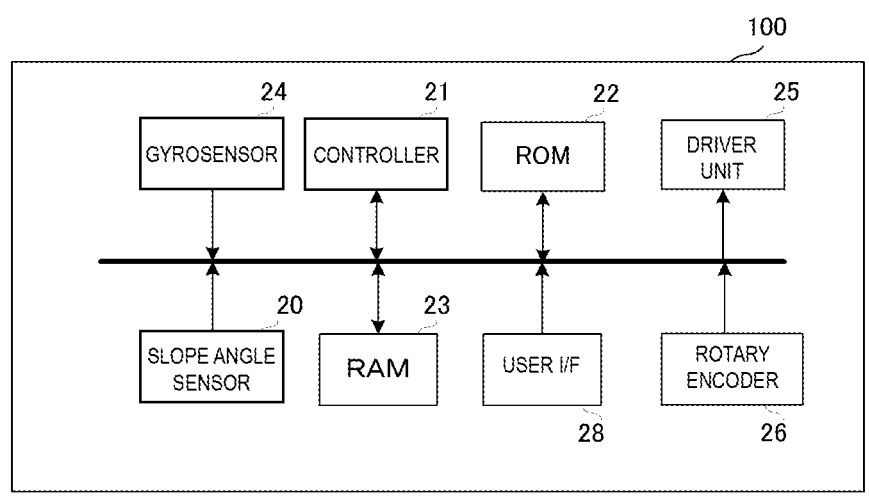
FIG. 4 is a control block diagram illustrating a configuration of the pushcart 100 shown in FIG. 1.

FIG. 4 is a control block diagram illustrating the configuration of the pushcart 100 shown in FIG. 1. The pushcart 100 includes the slope angle sensor 20, a controller 21, a ROM 22, a RAM 23, the gyro sensor 24, a driver unit 25, the rotary encoder 26, and the user I/F 28.

Note that the rotary encoder 26 corresponds to "rotation detector" of the present disclosure.

The controller 21 is a functional unit configured to integrally control the pushcart 100, and realizes various kinds of operations by reading out programs stored in the ROM 22 and loading these programs in the RAM 23.

The rotary encoder 26 detects a rotational angle of the main wheels 111 and outputs the detected result to the controller 21. The controller 21 differentiates the rotational angle of the main wheels 111 inputted from the rotary encoder 26 and calculates an angular velocity of the main wheels 111.

The slope angle sensor 20 detects a slope angle of the dolly portion 112 relative to the vertical direction and outputs the detected result to the controller 21.

The gyrosensor 24 detects an angular velocity of the steering unit 110 in the pitch direction (a rotational direction about a rotational shaft of the hinge unit 115 shown in FIG. 1) and outputs the detected result to the controller 21.

Although an example in which the rotary encoder 26 is used as a method to detect whether or not the main wheels 111 are rotated is cited in the present embodiment, the disclosure is not limited thereto and any other sensors may be used instead.

Likewise, in the present embodiment, although an example in which the slope angle sensor 20 is used as a slope angle detector to detect an angle change in the slope angle of the dolly portion 112 is described, the disclosure is not limited thereto. For example, it is sufficient that the slope angle detector of the present disclosure is realized by using at least one of a slope angle sensor, an acceleration sensor, and a gyrosensor.

Likewise, in the present embodiment, although an example in which the gyrosensor 24 is used as an angle change detector to detect an angle change in the slope angle of the steering unit 110 in the pitch direction is described, the disclosure is not limited thereto. It is sufficient that the angle change detector of the present disclosure is realized by including at least one of a gyrosensor, a slope angle sensor, and an acceleration sensor. For example, in the case where a slope angle sensor (not shown) is provided in place of the gyrosensor 24 on the steering unit 110, the slope angle of the steering unit 110 detected by the stated slope angle sensor is differentiated and then a slope angular velocity of the steering unit 110 is calculated. Further, as another example, the pushcart 100 may include a rotary encoder in the hinge unit 115 and detect the slope angle of the steering unit 110 in the pitch direction based on the detection result of the above rotary encoder.

In the case where the pushcart 100 includes a plurality of sensors as the slope angle detector, the controller 21 may compare the detection results from the plurality of sensors and determine that a failure has occurred in one of the sensors if there exists a difference among the plurality of detection results. Likewise, in the case where the pushcart 100 includes a plurality of sensors to realize the angle change detector, the controller 21 may determine, through comparing the detection results from the plurality of sensors, that a failure has occurred in one of the sensors.

Then, based on the detection results of the gyrosensor 24 and the slope angle sensor 20, the controller 21 performs inverted pendulum control in which the main wheels 111 are rotated by the driver unit 25 so that the angle change of the steering unit 110 in the pitch direction becomes 0 and the slope angle of the steering unit 110 relative to the vertical direction comes to a target value (for example, 0 or nearly 0).

The above-mentioned inverted pendulum control will be described in detail hereinafter.

The controller 21 calculates a slope angle of the dolly portion 112 based on the detection result of the slope angle sensor 20. Through this, the controller 21 estimates a slope angle of the ground surface G, on which the pushcart 100 is present, relative to the vertical direction. For example, in the case where the pushcart 100 is present on a sloping road, gravitational torque due to a slant of the sloping road (a slope angle of the ground surface G relative to the horizontal surface) acts on the main wheels 111 and causes the pushcart 100 to unintendedly descend the sloping road.

As such, the controller 21 calculates a first torque value to compensate the gravitational torque based on the slope angle of the dolly portion 112. Note that in the case where the pushcart 100 is present on a flat road with the slant being 0 degree, the first torque value is 0.

Further, the controller 21 calculates a slope angular velocity of the steering unit 110 based on the detection result of the gyrosensor 24. Furthermore, the controller 21 calculates a slope angle of the steering unit 110 by integrating the slope angular velocity of the steering unit 110.

The controller 21 calculates a differential value between a preset target slope angle (for example, 0 degree) and a current slope angle of the steering unit 110 having been calculated based on the detection result of the gyrosensor 24, and then calculates a target value of the slope angular velocity of the steering unit 110 that can make the above differential value become 0. Subsequently, the controller 21 calculates a differential value between the calculated target value of the slope angular velocity and a current slope angular velocity of the steering unit 110 having been calculated based on the detection result of the gyrosensor 24, and then calculates a second torque value that can make the above differential value become 0.

Subsequently, the controller 21 calculates a third torque in which the first torque and second torque having been calculated are combined, and outputs the calculation result to the driver unit 25.

The driver unit 25 drives a motor for rotating a shaft attached to the pair of main wheels 111. The driver unit 25 applies the torque value inputted from the controller 21 to the motor of the main wheels 111 so as to rotate the main wheels 111.

As discussed above, the pushcart 100 performs the inverted pendulum control to maintain a state in which the steering unit 110 stands upright facing the vertical direction. As such, even in the case where a user holds the holding portion 116 and pushes the holding portion 116 in a forward direction P, the main wheels 111 rotate and the dolly portion 112 also moves in the forward direction P so that the posture of the steering unit 110 is maintained to be constant. Conversely, in the case where the user holds the holding portion 116 and pulls the holding portion 116 in the backward direction, the main wheels 111 rotate and the dolly portion 112 also moves in the backward direction so that the posture of the steering unit 110 is maintained to be constant.

By performing the inverted pendulum control, the pushcart 100 moves in a direction in which the user U moves the holding portion 116. In other words, the pushcart 100 moves following the movement of the holding portion 116 caused by the operation of the user U. With this, the pushcart 100 can give a feeling of safety to the user U because of having the above movement catch-up capability in comparison with a pushcart that does not perform inverted pendulum control (for example, a pushcart moved by the lever operation).

Further, for example, even in the case where the pushcart 100 is present on a sloping road, because torque for compensating the gravitational torque due to the slant of the sloping road acts on the main wheels 111, the pushcart 100 can be prevented from unintendedly descending the sloping road.

The controller 21 stops the driving of the main wheels 111 by the driver unit 25 in the case where the controller 21 determines, based on the output of the gyrosensor 24 and the output of the rotary encoder 26, that the rotation of the main wheels 111 is stopped in a state in which the angle change of the steering unit 110 in the pitch direction is not 0. This makes it possible to prevent the motor of the driver unit 25 from being damaged by stopping the driving of the main wheels 111 in the case where the auxiliary wheels 113 are caught by a step, wall, or the like and do not proceed even if the user U pushes the pushcart 100. However, the controller 21 may stop the driving of the main wheels 111 by the driver unit 25 not only when the number of rotations of the main wheels 111 is precisely 0, but also when the number of rotations of the main wheels 111 in the pitch direction is lower than a predetermined threshold 1. In other words, the controller 21 may stop the driving of the main wheels 111 in the case where the rotation of the main wheels 111 is substantially stopped in a state where the angle change of the steering unit 110 in the pitch direction is not 0.

Moreover, in the case where the number of rotations of the main wheels 111 in the pitch direction is higher than a predetermined threshold 2 (note that, threshold 2>threshold 1), the controller 21 may also stop the driving of the main wheels 111 by the driver unit 25. For example, the pushcart 100 stops the driving of the main wheels 111 in consideration of safety in the case where the main wheels 111 spin due to slipping and the number of rotations of the main wheels 111 becomes higher than the threshold 2.

In the configuration discussed above, while taking the hinge unit 115 on one end of the steering unit 110 as a rotational shaft, the pushcart 100 is constituted such that the holding portion 116 on the other end of the steering unit 110 is rotated. That is, in the case where a length from the stated rotational shaft to the other end of the steering unit 110 is taken as L2, and an angle by which the user U holds the holding portion 116 and pushes the steering unit 110, standing upright in the vertical direction, in the pitch direction is taken as θ, the movement distance of the holding portion 116 is represented as L2·sin θ.

Figure 11A:
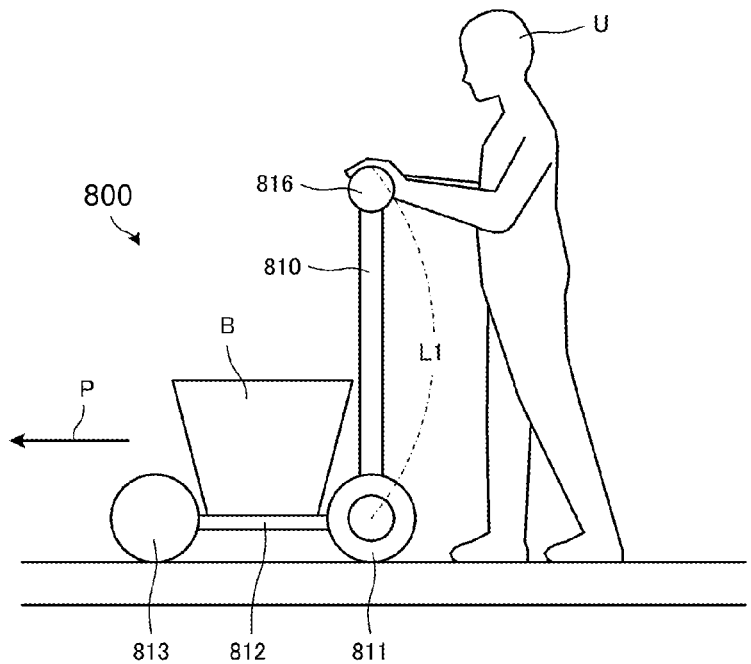
FIGS. 11A and 11B include schematic side views of a pushcart 800 assuming the application of a conventional technique.
Figure 11B:
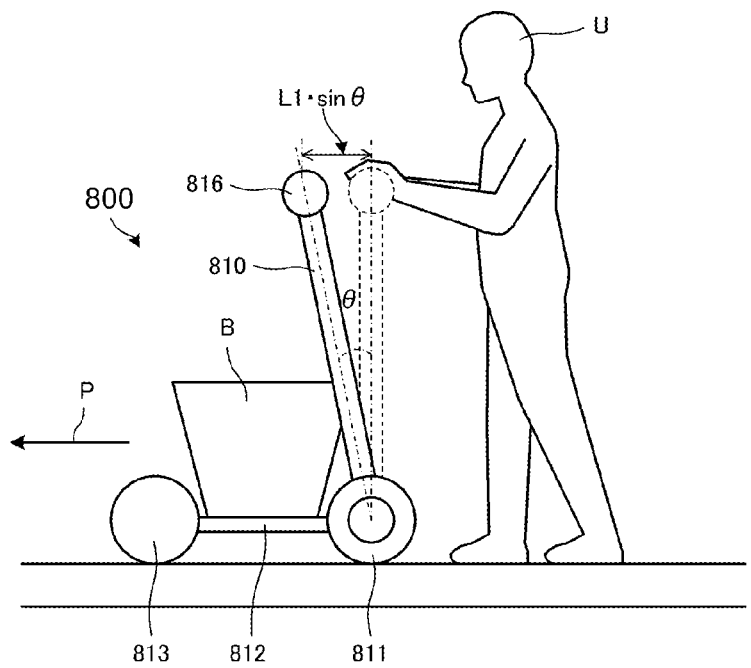

The length L2 needs to be set to a length in accordance with the height of the user U to use the pushcart 100. However, the length L2 is shorter than the length L1 of the pushcart 800 assuming the application of the technique as shown in FIGS. 11A and 11B, by an amount of length of the connecting unit 114 extending in the vertical direction.

Accordingly, the movement distance L2·sin θ of the holding portion 116 of the pushcart 100 is shorter than the movement distance L1·sin θ of the holding portion 816 of the pushcart 800 assuming the application of the conventional technique. As such, when the user U holds the holding portion 116 and moves the pushcart 100, it is sufficient for the user U to push the holding portion 116 in the pitch direction by a short distance in comparison with the pushcart 800 assuming the application of the conventional technique.

Therefore, according to the pushcart 100, it is possible to make the movement distance L2·sin θ of the holding portion 116 shorter than that in the pushcart 800 assuming the application of the conventional technique, and improve the user-operability.

As discussed above, because the blocking mechanism is provided in the hinge unit 115, the steering unit 110 does not rotate up to no less than a predetermined angle relative to the vertical direction (for example, 30 degrees in the forward direction and backward direction, respectively).

To be more specific, for example, there is a case where the auxiliary wheels 113 make contact with a step during the travelling of the pushcart 100 and cannot ride over the step with the torque of the pushcart 100 even if the user U rotates the holding portion 116. In this case, the auxiliary wheels 113 and the main wheels 111 can ride over the step by the user U pushing, with his or her force, the holding portion 116 whose rotation is blocked at a predetermined angle.

At this time, because the steering unit 110 does not rotate up to no less than a predetermined angle relative to the vertical direction, in other words, the torque of the pushcart 100 is restricted by the blocking mechanism, a sudden start of the pushcart 100 can be prevented immediately after the auxiliary wheels 113 and the main wheels 111 have ridden over the step.

In addition, for example, even in the case where the power of the pushcart 100 is turned off, the user U can manually move the pushcart 100 by pushing, with his or her force, the holding portion 116 whose rotation is blocked at a predetermined angle. At this time, a connecting portion of the steering unit 110 and the holding portion 116 is fixed in an initial state (a state of being not operated). This makes it easy for the user U to hold the holding portion 116 and manually move the pushcart 100.

Hereinafter, a pushcart 200 according to a second embodiment of the present disclosure will be described.

Figure 5:
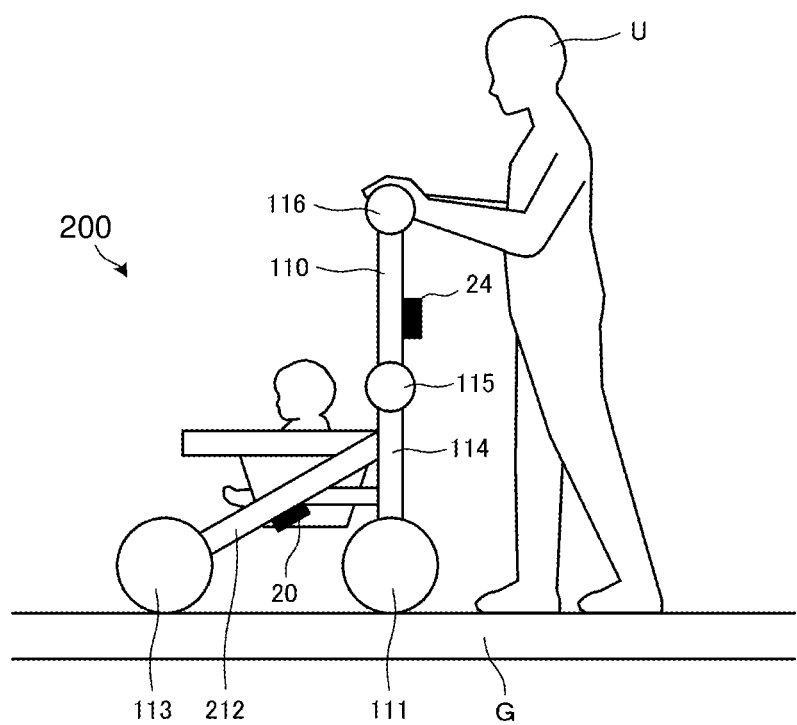
FIG. 5 is a schematic side view of a pushcart 200 according to a second embodiment of the present disclosure.

FIG. 5 is a schematic side view of the pushcart 200 according to the second embodiment of the present disclosure.

The pushcart 200 of the second embodiment differs from the pushcart 100 of the first embodiment in a point that a supporter 212 is included therein in place of the dolly portion 112. The supporter 212 is formed in a rectangular frame shape, and the pair of auxiliary wheels 113 opposing to each other is supported by the supporter 212 in a rotatable manner. The connecting unit 114 is connected to an end of the supporter 212 on the opposite side to the auxiliary wheels 113. In the pushcart 200, the supporter 212 corresponds to "base unit" of the present disclosure. The pushcart 200 is used as a baby carriage, for example. Since other constituent elements are the same as those of the pushcart 100, descriptions thereof are omitted herein.

Hereinafter, a pushcart 300 according to a third embodiment of the present disclosure will be described.

Figure 6:
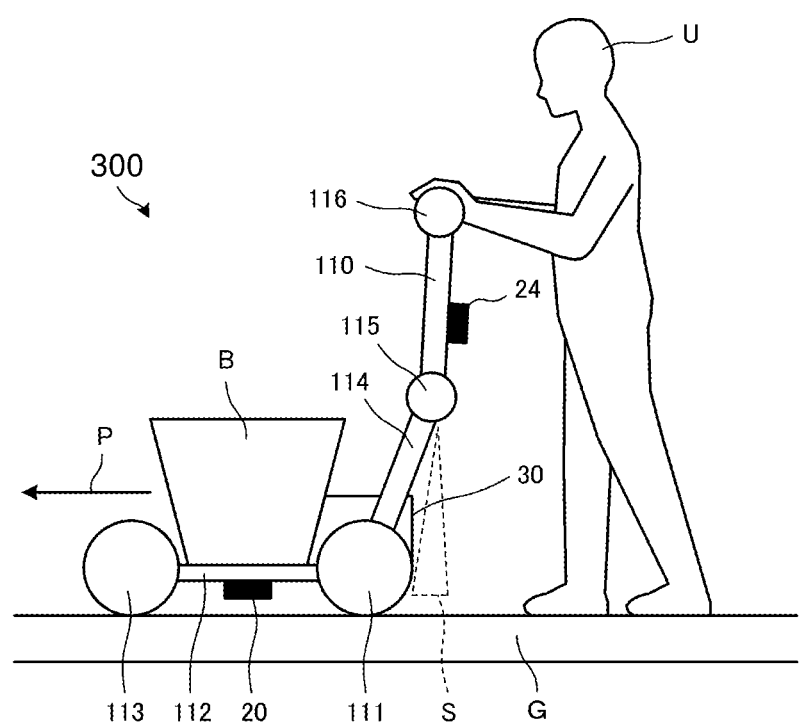
FIG. 6 is a schematic side view of a pushcart 300 according to a third embodiment of the present disclosure.

FIG. 6 is a schematic side view of the pushcart 300 according to the third embodiment of the present disclosure.

The pushcart 300 of the third embodiment differs from the pushcart 100 of the first embodiment in a point that an end of the connecting unit 114 on the steering unit 110 side is positioned in a space that is located in an outer side portion relative to the main wheels 111 and the auxiliary wheel 113 in the forward direction P, and that is also located in the opposite direction of the forward direction P (backward direction). In the pushcart 300, the connecting unit 114 extends in a direction being distanced from the ground surface G with which the main wheels 111 make contact. Since other constituent elements are the same as those of the pushcart 100, descriptions thereof are omitted herein.

In the pushcart 300, the holding portion 116 more approaches the user U side than that in the pushcart 100 shown in FIGS. 3A and 3B. With this, in the case of the pushcart 300, a stepping space S for the user U is spread wider than the case of the pushcart 100 shown in FIGS. 3A and 3B. Because of this, it can prevent the foot of the user U from contacting the main wheels 111 of the pushcart 300 when the user U is pushing and moving the pushcart 300, for example.

Hereinafter, a pushcart 400 according to a fourth embodiment of the present disclosure will be described.

Figure 7:
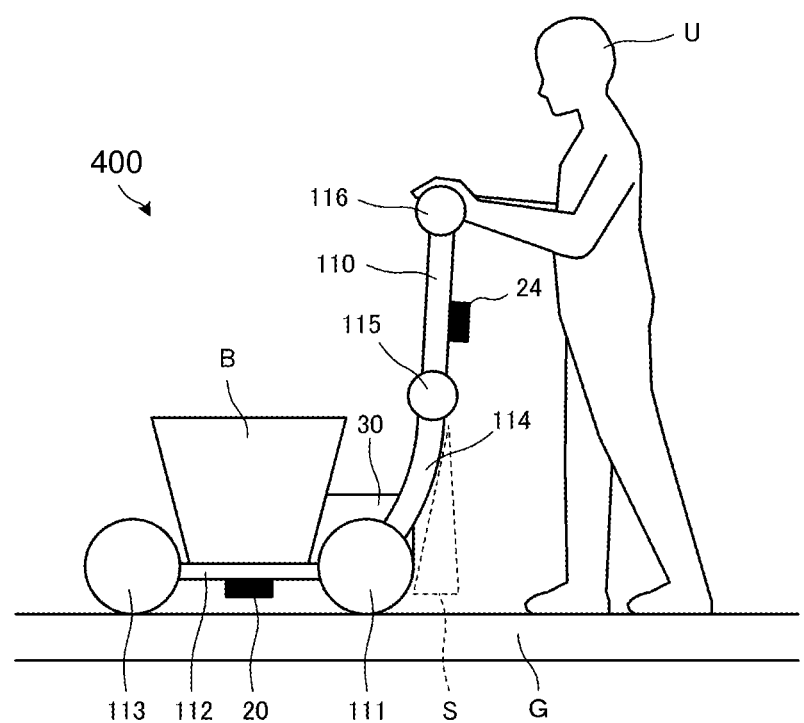
FIG. 7 is a schematic side view of a pushcart 400 according to a fourth embodiment of the present disclosure.

FIG. 7 is a schematic side view of the pushcart 400 according to the fourth embodiment of the present disclosure.

As shown in the schematic side views of FIG. 6 and FIG. 7, the pushcart 400 of the fourth embodiment differs from the pushcart 300 of the third embodiment in a point that the connecting unit 114 is curved so that a portion thereof on the opposite direction side of the forward direction P becomes a bent outer circumference side.

In the pushcart 400, although the connecting unit 114 is formed in a curved shape, the holding portion 116 more approaches the user U than that in the pushcart 100 shown in FIGS. 3A and 3B, and the stepping space S is spread wider.

Hereinafter, a pushcart 500 according to a fifth embodiment of the present disclosure will be described.

Figure 8:
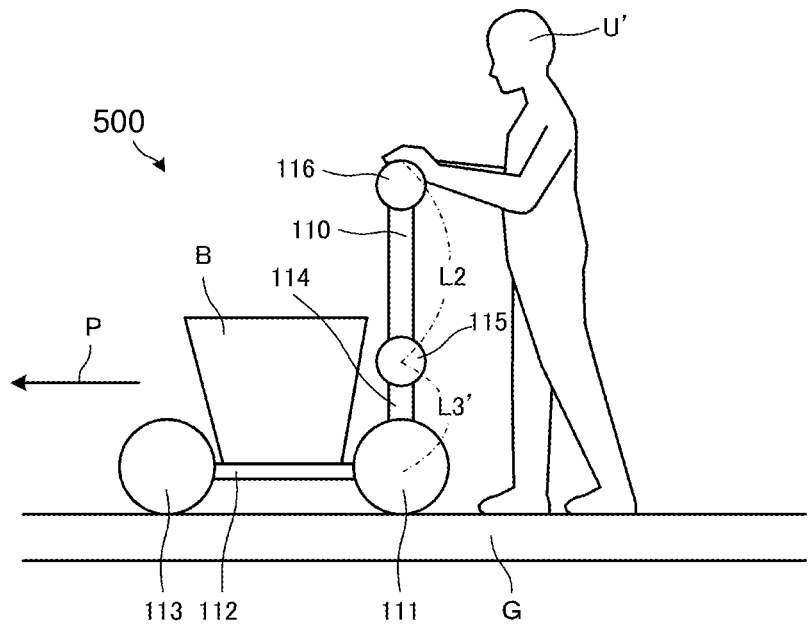
FIG. 8 is a schematic side view of a pushcart 500 according to a fifth embodiment of the present disclosure.

FIG. 8 is a schematic side view of the pushcart 500 according to the fifth embodiment of the present disclosure.

The pushcart 500 of the fifth embodiment differs from the pushcart 100 of the first embodiment in a point that the pushcart 500 includes an adjustment mechanism for adjusting the length of the connecting unit 114.

The adjustment mechanism is, for example, a retractable pipe whose length is fixedly set by hand or fixedly set length is released also by hand. However, the adjustment mechanism may be a mechanism configured to automatically adjust the length of the connecting unit 114 using a motor.

In the case where a length from the rotational shaft of the main wheels 111 to the rotational shaft of the hinge unit 115 is taken as L3, the length L3 corresponds to the length of the connecting unit 114. For example, as shown in FIG. 8, by making a length L3' of the pushcart 500 shorter than the length L3 of the pushcart 100 shown in FIGS. 3A and 3B, a height from the ground surface G to the holding portion 116 (corresponds to the sum of L2 and L3) becomes lower than the height of the pushcart 100 shown in FIGS. 3A and 3B, corresponding to a user U' shorter in height than the user U. Conversely, although not shown, by making the length L3' of the pushcart 500 longer than the length L3 of the pushcart 100 shown in FIGS. 3A and 3B, the height from the ground surface G to the holding portion 116 can be made higher than the height of the pushcart 100 shown in FIGS. 3A and 3B, corresponding to the user U' taller than the user U.

Further, the length L2 of the pushcart 500 equals the length L2 of the pushcart 100 shown in FIGS. 3A and 3B. This makes a movement distance L2·sin θ of the holding portion 116 in the pushcart 500 equal to the movement distance L2·sin θ of the holding portion 116 in the pushcart 100. Accordingly, even if the total length (L2+L3) of the connecting unit 114 and the steering unit 110 is changed, operability for the user U' that moves the holding portion 116 is maintained because the movement distance L2·sin θ of the holding portion 116 is unchanged.

Note that, however, the adjustment mechanism in the present embodiment may be a mechanism configured to adjust the length L2.

Although all of the pushcarts 100, 200, and 300 include the auxiliary wheels 113 in front and the main wheels 111 in back as drive wheels, the disclosure is not limited thereto. For example, by exchanging the positions of the main wheels 111 and the auxiliary wheels 113, the main wheels 111 as the drive wheels may be provided in front and the auxiliary wheels 113 may be provided in back.

Figure 9:
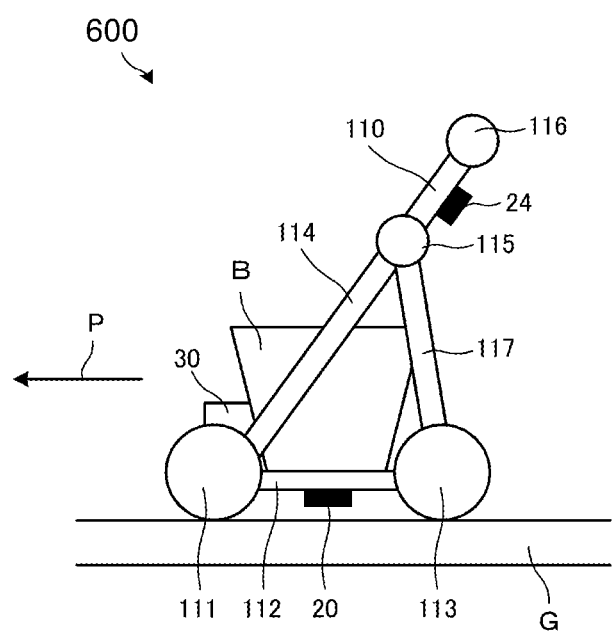
FIG. 9 is a schematic side view of a pushcart 600 according to a sixth embodiment of the present disclosure.
Figure 10:
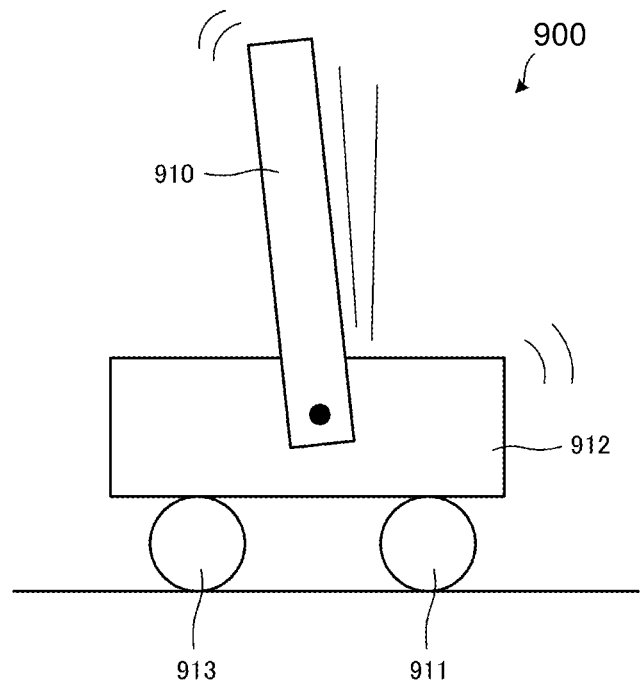
FIG. 10 is a schematic side view of a pushcart 900 disclosed in Non Patent Document 1.

For example, as shown in a schematic side view of FIG. 9, in a pushcart 600 according to a sixth embodiment of the present disclosure, the main wheels 111 are positioned in front of the auxiliary wheels 113 in the forward direction P.

To be more specific, as shown in the schematic side view of FIG. 9, the connecting unit 114 is slanted so that the hinge unit 115 is positioned at the opposite direction side of the forward direction P. The controller 21 takes a direction along an extension direction of the slanted connecting unit 114 as a reference direction, and performs inverted pendulum control so that an angle change in the pitch direction relative to the reference direction becomes 0.

The pushcart 600 includes a supporter 117 that extends from the rotational shaft of the auxiliary wheels 113 in a direction being distanced from the ground surface G. An end portion of the supporter 117 on the opposite side to the auxiliary wheels 113 is supported by the hinge unit 115. However, it is not absolutely necessary to include the supporter 117.

Because the pushcart 600 according to the sixth embodiment of the present disclosure is a front drive pushcart, even if the front wheel (main wheel 111) makes contact with a step, the pushcart 600 is likely to ride over the step in comparison with a rear drive pushcart.

Lastly, the descriptions of the above embodiments are merely examples in all ways and should be understood not to be limiting in any ways. The scope of the present disclosure is defined by the appended claims rather than by the aforementioned embodiments. Further, any meanings equivalent to the appended claims as well as all modifications made within the scope of the appended claims are intended to be encompassed in the scope of the present disclosure.

REFERENCE SIGNS LIST

20 SLOPE ANGLE SENSOR
21 CONTROLLER
22 ROM
23 RAM
24 GYROSENSOR
25 DRIVER UNIT
26 ROTARY ENCODER
30 CASE
100 PUSHCART
110 STEERING UNIT
111 MAIN WHEEL
112 DOLLY PORTION
113 AUXILIARY WHEEL
114 CONNECTING UNIT
115 HINGE UNIT
116 HOLDING PORTION
117 SUPPORTER
200 PUSHCART
212 SUPPORTER
300, 400, 500, 600 PUSHCART
800 PUSHCART
810 STEERING UNIT
811 MAIN WHEEL
812 DOLLY PORTION
813 AUXILIARY WHEEL
816 HOLDING PORTION
900 DOLLY
910 INVERTED PENDULUM
911 REAR WHEEL
912 DOLLY PORTION
913 FRONT WHEEL
B LOAD
G GROUND SURFACE
S STEPPING SPACE
U USER

The invention claimed is:
1. A pushcart comprising:
a base unit;
a plurality of main wheels supported by the base unit in a rotatable manner;
an auxiliary wheel supported by the base unit in a rotatable manner about a rotational shaft which differs from a rotational shaft of the plurality of main wheels;
a driver unit for driving the plurality of main wheels;
a controller for controlling the driver unit;
a connecting unit that is connected to the base unit and extends in a direction distanced from a ground surface with which the plurality of main wheels make contact;
a steering unit supported in a rotatable manner in a pitch direction at an end portion of the connecting unit on an opposite side to the plurality of main wheels; and
an angle change detector for detecting an angle change in a slope angle of the steering unit in the pitch direction,
wherein the controller controls the driver unit based on output of the angle change detector so that the angle change of the steering unit in the pitch direction becomes 0.

2. The pushcart according to claim 1, further comprising:
a blocking unit that prevents the steering unit from rotating at a predetermined angle or a larger angle.

3. The pushcart according to claim 1, further comprising:
a rotation detector for detecting whether or not the plurality of main wheels are being rotated,
wherein the controller stops driving of the plurality of main wheels by the driver unit in the case where the controller determines, based on output of the rotation detector, that the rotation of the plurality of main wheels is substantially stopped with the angle change of the steering unit in the pitch direction being not 0.

4. The pushcart according to claim 1, further comprising:
a slope angle detector for detecting an angle change in a slope angle of the base unit,
wherein the controller calculates, based on output of the slope angle detector, torque for compensating gravitational torque due to a slope of the ground surface and controls the driver unit.

5. The pushcart according to claim 1,
wherein an end portion of the connecting unit on the steering unit side is positioned in a space that is located in an outer side portion relative to the main wheels and the auxiliary wheel in a movement direction of the pushcart moved by the rotation of the plurality of main wheels, and that is located in the direction opposite to the movement direction.

6. The pushcart according to claim 1, further comprising:
an adjustment mechanism for adjusting length of one of the connecting unit and the steering unit.

7. The pushcart according to claim 1,
wherein the angle change detector includes a rotary encoder disposed in a connecting portion of the connecting unit and the steering unit.

8. The pushcart according to claim 1,
wherein the angle change detector includes at least one of a gyrosensor, a slope angle sensor, and an acceleration sensor.

9. The pushcart according to claim 2, further comprising:
a rotation detector for detecting whether or not the plurality of main wheels are being rotated,
wherein the controller stops driving of the plurality of main wheels by the driver unit in the case where the controller determines, based on output of the rotation detector, that the rotation of the plurality of main wheels is substantially stopped with the angle change of the steering unit in the pitch direction being not 0.

10. The pushcart according to claim 2, further comprising:
a slope angle detector for detecting an angle change in a slope angle of the base unit,
wherein the controller calculates, based on output of the slope angle detector, torque for compensating gravitational torque due to a slope of the ground surface and controls the driver unit.

11. The pushcart according to claim 3, further comprising:
a slope angle detector for detecting an angle change in a slope angle of the base unit,
wherein the controller calculates, based on output of the slope angle detector, torque for compensating gravitational torque due to a slope of the ground surface and controls the driver unit.

12. The pushcart according to claim 2,
wherein an end portion of the connecting unit on the steering unit side is positioned in a space that is located in an outer side portion relative to the main wheels and the auxiliary wheel in a movement direction of the pushcart moved by the rotation of the plurality of main wheels, and that is located in the direction opposite to the movement direction.

13. The pushcart according to claim 3,
wherein an end portion of the connecting unit on the steering unit side is positioned in a space that is located in an outer side portion relative to the main wheels and the auxiliary wheel in a movement direction of the pushcart moved by the rotation of the plurality of main wheels, and that is located in the direction opposite to the movement direction.

14. The pushcart according to claim 4,
wherein an end portion of the connecting unit on the steering unit side is positioned in a space that is located in an outer side portion relative to the main wheels and the auxiliary wheel in a movement direction of the pushcart moved by the rotation of the plurality of main wheels, and that is located in the direction opposite to the movement direction.

15. The pushcart according to claim 2, further comprising:
an adjustment mechanism for adjusting length of one of the connecting unit and the steering unit.

16. The pushcart according to claim 3, further comprising:
an adjustment mechanism for adjusting length of one of the connecting unit and the steering unit.

17. The pushcart according to claim 4, further comprising:
an adjustment mechanism for adjusting length of one of the connecting unit and the steering unit.

18. The pushcart according to claim 5, further comprising:
an adjustment mechanism for adjusting length of one of the connecting unit and the steering unit.

19. The pushcart according to claim 2,
wherein the angle change detector includes a rotary encoder disposed in a connecting portion of the connecting unit and the steering unit.

20. The pushcart according to claim 3,
wherein the angle change detector includes a rotary encoder disposed in a connecting portion of the connecting unit and the steering unit.

* * * * *